(12) United States Patent
Lu et al.

(10) Patent No.: US 12,380,661 B2
(45) Date of Patent: Aug. 5, 2025

(54) AUGMENTED REALITY OVERLAY OF DIGITAL MODEL OF DEBRIS LOCATION TO DETECT ENVIRONMENTAL RISKS

(71) Applicant: INTERNATIONAL BUSINESS MACHINES CORPORATION, Armonk, NY (US)

(72) Inventors: Fang Lu, Billerica, MA (US); Tushar Agrawal, West Fargo, ND (US); Sarbajit K. Rakshit, Kolkata (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 18/492,835

(22) Filed: Oct. 24, 2023

(65) Prior Publication Data

US 2025/0131662 A1    Apr. 24, 2025

(51) Int. Cl.
  *G06T 19/00* (2011.01)
  *G06V 10/25* (2022.01)
  *G06V 10/764* (2022.01)

(52) U.S. Cl.
  CPC ............ *G06T 19/006* (2013.01); *G06V 10/25* (2022.01); *G06V 10/764* (2022.01); *G06V 2201/07* (2022.01)

(58) Field of Classification Search
  CPC ...... G06T 19/006; G06V 20/20; G06V 10/25; G06V 20/35; G06V 10/764; G06V 10/255;

(Continued)

(56) References Cited

U.S. PATENT DOCUMENTS

| | | |
|---|---|---|
| 6,389,747 B1 | 5/2002 | Chang |
| 10,071,404 B2 | 9/2018 | Zhang |

(Continued)

FOREIGN PATENT DOCUMENTS

| | | | | |
|---|---|---|---|---|
| CN | 110436082 A | * | 11/2019 | ............... B65F 1/00 |
| CN | 108663413 B | | 10/2020 | |

OTHER PUBLICATIONS

Anonymous, "Augmented Reality System to Help User Avoid Environmental Irritants", An IP.com Prior Art Database Technical Disclosure, IP.com No. IPCOM000261767D, IP.com Electronic Publication Date: Apr. 2, 2020, 6 pages.

(Continued)

*Primary Examiner* — Koosha Sharifi-Tafreshi
(74) *Attorney, Agent, or Firm* — Michael A. Petrocelli

(57) ABSTRACT

A digital model is generated of a debris location where the digital model includes an augmented reality overlay of the debris location. Digital data from sensors at a debris field is received at a computer, and the digital data depicts debris in the debris field. Materials in the debris field are detected and identified based on the detected materials in the debris field. Layers of materials in the debris field are identified. A digital model is generated of the materials in the debris field including in the layers. Using the computer and an augmented reality (AR) device, an augmented reality overlay is generated based on the digital model of the materials in the debris fields. The augmented reality overlay is superimposed over the digital model of the materials in the debris field to indicate the materials in the debris field and the materials in the layers of the debris field.

20 Claims, 6 Drawing Sheets

(58) Field of Classification Search
CPC ........ G06V 10/20; G06V 10/82; G06V 20/10; G06V 20/188; G06V 20/17; A61B 2090/365
See application file for complete search history.

(56) References Cited

U.S. PATENT DOCUMENTS

| | | |
|---|---|---|
| 2018/0027772 A1 | 2/2018 | Gordon |
| 2018/0188728 A1 | 7/2018 | Erickson |
| 2020/0334907 A1 | 10/2020 | Bender |
| 2020/0355552 A1 | 11/2020 | Kreitinger |

OTHER PUBLICATIONS

Anwar, "How Singapore fixed its big trash problem", CNBC, International Digital Originals, Apr. 26, 2021, 3 pages.
Clifford, "Trillions of pounds of trash: New technology tries to solve an old garbage problem", CNBC Disruptor 50, May 29, 2021, 11 pages.
Elmore, "3 Tips for Modernizing Your Landfill and Waste Management Plan," [Accessed May 5, 2023], 5 pages, https://firmatek.com/2018/12/13/3-tips-for-modernizing-your-landfill-and-waste-management-plan/.
Equinox's Drones, "How Drones are Helping with Waste Management", accessed on May 12, 2023, 10 pages.
Filkin et al., "Unmanned Aerial Vehicles for Operational Monitoring of Landfills", MDPI Article, Drones May 2021, 125, pp. 1-17.
Firmatek, "Landfill & Waste Management," [Accessed May 5, 2023], 6 pages, https://firmatek.com/industries/landfill-and-waste-management/.
Hamlin, "3 Benefits of 2D & 3D Mapping with Drones", DRONESOFPREY, Mar. 15, 2019, 4 pages.
IBM Envizi, "Decarbonization", Software Platform, accessed on May 12, 2023, 11 pages.
IBM Envizi, "Emissions Management", Software, accessed on May 12, 2023, 11 pages.
IBM, "IBM Acquires Envizi to Help Organizations Accelerate Sustainability Initiatives and Achieve Environmental Goals", IBM Newsroom, Jan. 11, 2022, 4 pages.
IBM, "Managing Climate Risk", accessed May 12, 2023, 11 pages.
IBM, "Sustainability solutions from IBM", Software, accessed on May 12, 2023, 18 pages.
Joshi, "4 ways AI can revolutionize waste management", Allerin, Oct. 3, 2018, 3 pages.
medium.com, "5 Ways to Improve the Accuracy of Your Drone Models with 3D Mapping Software", Published in DroneDeploy's Blog, May 2, 2017, 17 pages.
Pahl, "How Machine Learning and Robotics are Solving the Plastic Sorting Crisis", Plug and Play Tech Center, Published Oct. 29, 2020, 11 pages.
Propeller, "Drone Solutions for Waste Management", An end-to-end 3D drone mapping and data analytics solution for landfill management, accessed on May 12, 2023, 6 pages.
Spencer, "How AI can help reduce landfill waste", IBM, accessed on May 12, 2023, 11 pages.
Texian Geospatial, "Landfill Operation & Management Solution", ESRI ArcGIS Solution, accessed May 12, 2023, 4 pages.
The New Indian Express, "Soon, a drone to watch out for fire at 650-acre Vellalore dump yard", Published: Jul. 26, 2017, 4 pages.
Wang et al., "How AI Can Help US Recycle", An application of Convolutional Neural Networks (CNNs) to waste image-classification, Published in Towards Data Science, Jun. 9, 2021, 26 pages.

\* cited by examiner

AUGMENTED REALITY OVERLAY OF DIGITAL MODEL OF DEBRIS LOCATION TO DETECT ENVIRONMENTAL RISKS

BACKGROUND

The present disclosure relates to using augmented reality and digital models in assessing environmental risks at a location.

In one example, waste dumping sites such as landfills can be a cause of pollution and can precipitate unwanted environmental consequences. For example, garbage dumped in landfills decomposes slowly and poses a concern in the future. Landfills can have a large footprint and be difficult to maneuver in and around. A contaminated area in part or all of a garbage landfill can be a breeding ground for diseases outbreaks, and people or animals venturing into the garbage landfill area can increase their likelihood for contracting diseases, such as respiratory disorders, asthma, bronchitis, and breathing issue, and even cancers over other diseases, health concerns and conditions, and bacterial contaminations.

SUMMARY

The present disclosure recognizes the shortcomings and problems associated with current techniques for generating digital models for detecting environmental risks at a debris location. Embodiments of the present invention provide techniques for generating an augmented reality overlay of a digital model of a debris location to detect environmental risks for waste management.

In an aspect according to the present invention, a computer-implemented method for generating an augmented reality overlay of a digital model of a debris location to detect environmental risks for waste management includes receiving, using a computer, digital data from sensors at a debris field at a location, the digital data depicting debris in the debris field at the location. The method includes detecting, using the computer, materials in the debris field, and identifying the materials in the debris field based on the detecting of the materials in the debris field. The method includes identifying layers of materials in the debris field based on the identification of the materials in the debris field, and generating, using the computer, a digital model of the materials in the debris field including in the layers. The method includes generating, using the computer and an augmented reality (AR) device, an augmented reality overlay based on the digital model of the materials in the debris fields. The method includes superimposing, using the computer, the augmented reality overlay over the digital model of the materials in the debris field to indicate the materials in the debris field and the materials in the layers of the debris field.

In a related aspect, the method further includes classifying the materials into types to identify the types of materials in the layers in the digital model.

In a related aspect, the method further includes generating virtual fencing on the digital model to indicate areas of sensitive materials.

In a related aspect, the method further includes assessing the areas of sensitive materials; and determining materials which cannot be deposited in an area of the areas of sensitive materials to minimize contamination.

In a related aspect, the received digital data includes video.

In a related aspect, the received digital data is received from Internet of Things (IoT) connected devices.

In a related aspect, the location is an environmentally sensitive location including hazardous materials for waste management.

In a related aspect, the location is an environmentally sensitive location designated as a landfill having hazardous materials for waste management.

In a related aspect, the method further includes updating the receiving, using the computer, of the digital data from the sensors at the debris field by receiving updated digital data from the sensors; updating the detecting, using the computer, the materials in the debris field; updating the identifying of the materials in the debris field based on the updating of the detecting of the materials in the debris field; updating the identifying of the layers of materials in the debris field based on the updating of the identification of the materials in the debris field; updating the generating, using the computer, of the digital model of the materials in the debris field including in the layers; updating the generating, using the computer and the augmented reality (AR) device, of the augmented reality overlay based on the updated digital model of the materials in the debris fields; and superimposing, using the computer, the updated augmented reality overlay over the updated digital model of the materials in the debris field to indicate the materials in the debris field and the materials in the layers of the debris field.

In a related aspect, the method further includes iteratively generating the digital model to produce updated models; and iteratively generating the augmented reality overlay to produce updated augmented reality overlays.

In another aspect according to the invention, a system for generating an augmented reality overlay of a digital model of a debris location to detect environmental risks for waste management includes a computer system. The computer system includes: a computer processor, a computer-readable storage medium, and program instructions stored on the computer-readable storage medium being executable by the processor, to cause the computer system to perform the following functions to: receive, using a computer, digital data from sensors at a debris field at a location, the video and the digital data depicting debris in the debris field at the location; detect, using the computer, materials in the debris field; identify the materials in the debris field based on the detecting of the materials in the debris field; identify layers of materials in the debris field based on the identification of the materials in the debris field; generate, using the computer, a digital model of the materials in the debris field including in the layers; generate, using the computer and an augmented reality (AR) device, an augmented reality overlay based on the digital model of the materials in the debris fields; and superimpose, using the computer, the augmented reality overlay over the digital model of the materials in the debris field to indicate the materials in the debris field and the materials in the layers of the debris field.

In a related aspect, the system further includes classifying the materials into types to identify the types of materials in the layers in the digital model.

In a related aspect, the system includes generating virtual fencing on the digital model to indicate areas of sensitive materials.

In a related aspect, the system includes assessing the areas of sensitive materials; and determining materials which cannot be deposited in an area of the areas of sensitive materials to minimize contamination.

In a related aspect, the received digital data includes video.

In a related aspect, the received digital data is received from Internet of Things (IoT connected devices.

In a related aspect, wherein the location is an environmentally sensitive location including hazardous materials for waste management.

In a related aspect, the location is an environmentally sensitive location designated as a landfill having hazardous materials for waste management.

In a related aspect, the system further includes: updating the receiving, using the computer, of the digital data from the sensors at the debris field by receiving updated digital data from the sensors; updating the detecting, using the computer, the materials in the debris field; updating the identifying of the materials in the debris field based on the updating of the detecting of the materials in the debris field; updating the identifying of the layers of materials in the debris field based on the updating of the identification of the materials in the debris field; updating the generating, using the computer, of the digital model of the materials in the debris field including in the layers; updating the generating, using the computer and the augmented reality (AR) device, of the augmented reality overlay based on the updated digital model of the materials in the debris fields; and superimposing, using the computer, the updated augmented reality overlay over the updated digital model of the materials in the debris field to indicate the materials in the debris field and the materials in the layers of the debris field.

In another aspect according to the invention, a computer program product generates an augmented reality overlay of a digital model of a debris location to detect environmental risks for waste management. The computer program product includes a computer readable storage medium having program instructions embodied therewith, the program instructions executable by a computer to cause the computer to perform functions, by the computer, comprising the functions to: receive, using a computer, digital data from sensors at a debris field at a location, the video and the digital data depicting debris in the debris field at the location; detect, using the computer, materials in the debris field; identify the materials in the debris field based on the detecting of the materials in the debris field; identify layers of materials in the debris field based on the identification of the materials in the debris field; generate, using the computer, a digital model of the materials in the debris field including in the layers; generate, using the computer and an augmented reality (AR) device, an augmented reality overlay based on the digital model of the materials in the debris fields; and superimpose, using the computer, the augmented reality overlay over the digital model of the materials in the debris field to indicate the materials in the debris field and the materials in the layers of the debris field.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
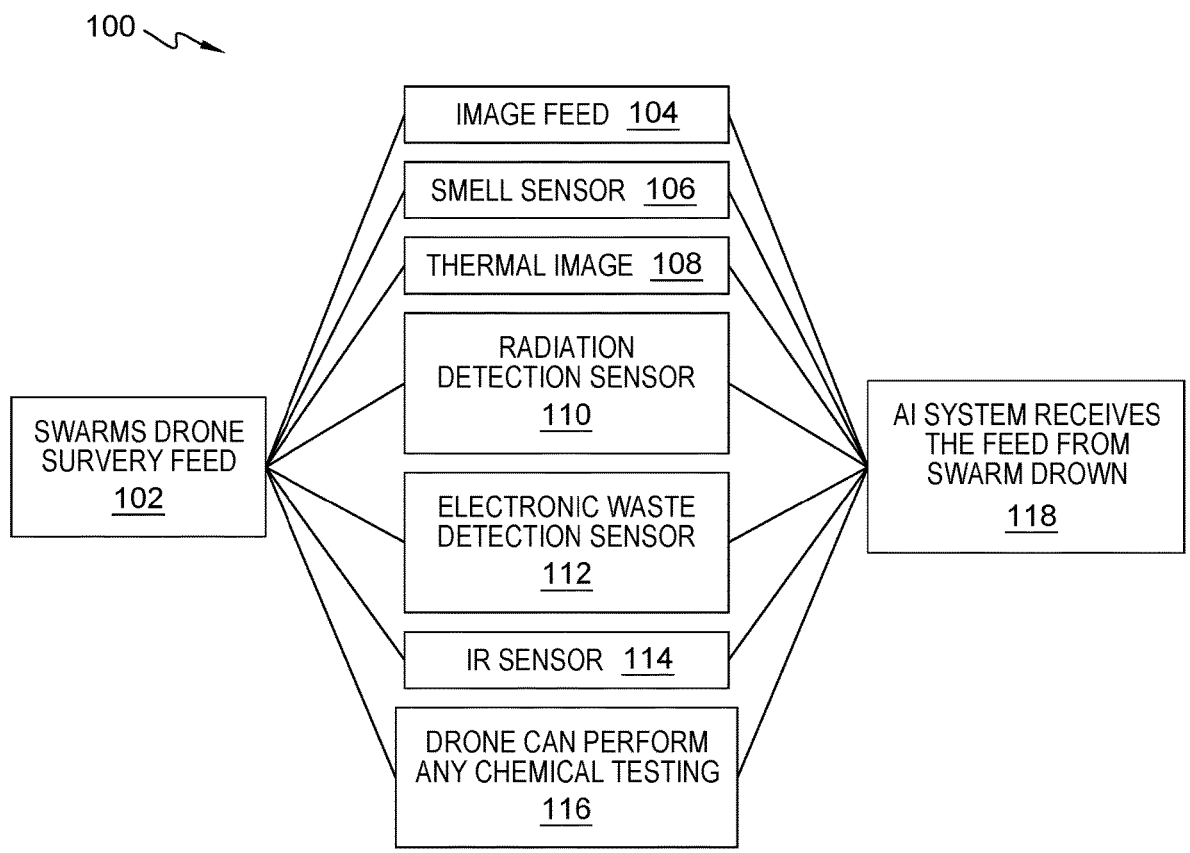
FIG. 1 is a schematic block diagram illustrating a system according to an embodiment of the present disclosure, for generating an augmented reality overlay of a digital model of a debris location to detect environmental risks for waste management.

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

EMBODIMENTS AND EXAMPLES

Embodiments and figures of the present disclosure may have the same or similar components as other embodiments. Such figures and descriptions illustrate and explain further examples and embodiments according to the present disclosure. Embodiments of the present disclosure can include operational actions and/or procedures. A method, such as a computer-implemented method, can include a series of operational blocks for implementing an embodiment according to the present disclosure which can include cooperation with one or more systems shown in the figures. The operational blocks of the methods and systems according to the present disclosure can include techniques, mechanism, modules, and the like for implementing the functions of the operations in accordance with the present disclosure. Similar components may have the same reference numerals. Components can operate in concert with a computer implemented method. It is understood that a customer can be an individual, or a group of individuals, or a company or an organization.

Embodiments of the present disclosure can include a system or method for generating an augmented reality overlay of a digital model of a debris location to detect environmental risks for waste management. In one example, a system can create a 3D (three dimensional) digital model of a landfill by using one or more cameras and one or more IoT (Internet of Things) feeds. The system can provide information to an admin via Augmented Reality (AR) (for example, specifications including spread/coverage area, impact to the environment, etc.) about different types of garbage in and between layers of earth and garbage. In one example, the system can leverage AI to propose a sequence to dispose of the garbage based on the type of material because certain layers of materials may need protection when exposed or may require special handling etc. The system can identify the destination to minimize the environmental hazards and provide a way to create virtual fencing to prevent any contamination and infection to individuals or a population.

In embodiments according to the present disclosure, a system can use a cameras having lenses (e.g., static image & video) and sensor captured data for an ecosystem using camera and IoT feed analysis. A 3D digital model of a landfill can be generated with different types of garbage present in different layers of the landfill. Thereby, based on the 3D model of the landfill, an administrator or user, can identify how different types of garbage are positioned or spread in one or more areas of the landfill including surrounding and in different layers.

The example system can generate a sequenced 3D model of the landfill (e.g., in layers), based on the 3D model of the landfill with different layers. The system can identify the appropriate sequence of garbage collection and loading, for example, which layers can be removed first, and which layer needs protection, etc.

In one example, layer specifications can include an AR system and an AI system showing the specification of each of the layers of garbage and identifying how those are impacting the environments. For example, the specifications can include depth of different layers, coverage area, types of problems created (e.g., gas-emitting), so that an administrator (e.g., operator or user) of garbage removal can plan for an appropriate sequence of removal.

In one example, possibilities for waste management opportunities in 3D (e.g., using AR) can include using an augmented reality system. An AR system can show different layers of garbage and can show the appropriate sequence of removal of the garbage from different layers. And, the system can navigate in a 3D augmented reality model to analyze the types of garbage, plan for action, and the possibility of reuse, etc.

In one example, relocation opportunities based on the 3D model of the garbage can include the system identifying in which location new types of garbage can be dumped. And using an augmented reality system, the system can guide where to dump the new types of garbage so that environmental impact can be minimized.

In one example, drones can be used as or with data collection sensors. Based on the specification of the garbage, environmental impact, chances of spreading with humans or animals, the system can use a swarm drone or robotic system to create a virtual fence to prevent animals and people from venturing into an area of the landfill. The system can also use AR-based virtual fencing to guide workers or users 520 to perform mobility.

In one example, a temperature/flammability warning system can be based on the temperatures shown from the objects among the garbage. The system can determine whether there is anything in the landfill that is flammable. The system triggers alerts if certain areas among the garbage or areas in the landfill exceeds an allowed temperature threshold.

In one example, dangerous objects detection can include the system analyzing the shape of the objects within the garbage to determine whether there are objects that are sharp which may cause harm to humans or animals. This can reduce the dangerous conditions during operations.

Referring to FIGS. 1, according to an embodiment of the present disclosure, a system 100 is used for generating an augmented reality overlay of a digital model of a debris location (e.g., landfill) to detect environmental risks. The system 100 includes a swarm of drones conducting a survey feed 102. The drone swarm(s) 102 provides an image feed 104, a smell sensor 106, a thermal image 108, a radiation detection sensor 110, an electronic waste detection sensor 112 (e.g., electric sniffer, eddy current, etc.), and IR (Infrared) sensor 114, and chemical testing 116. The feeds from the drone swarm can be fed into an AI system 118 which receives the feeds from the drone swarm, and classifies the feeds based on intensity, absolute value of various parameters and predicts the garbage areas with different layers in the landfill.

Figure 2:
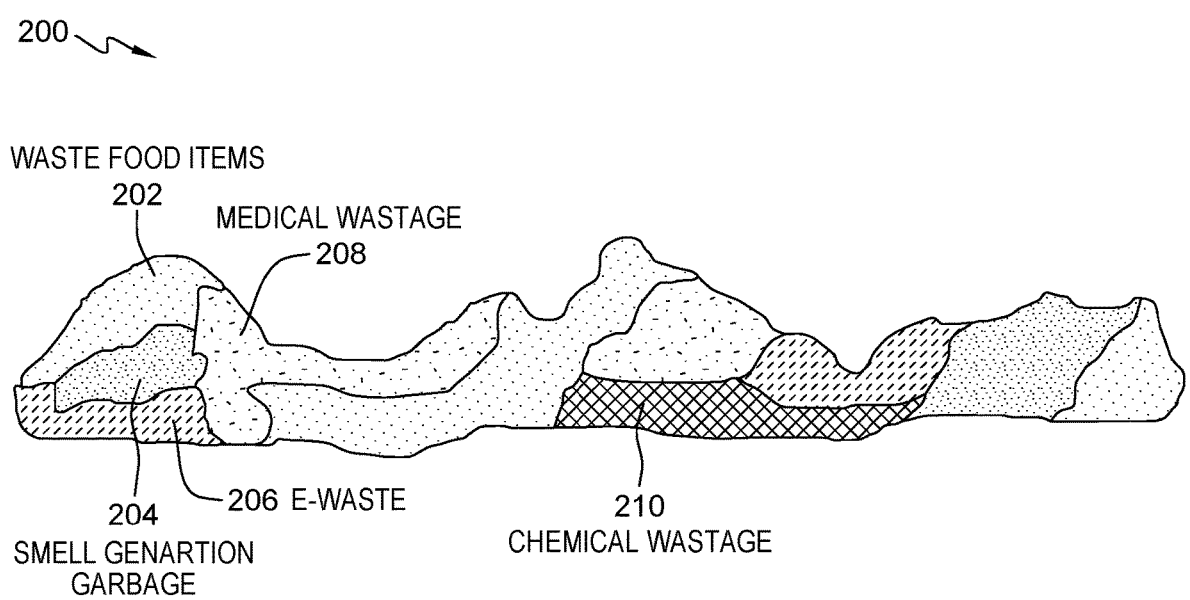
FIG. 2 is a schematic block diagram illustrating a digital model according to the system shown in FIG. 1, for generating an augmented reality overlay of a digital model of a debris location to detect environmental risks for waste management.

Referring to FIG. 2, according to an embodiment of the present disclosure, the system 100 includes an AI overlay of a digital model 200 depicting the landfill. The AI system 118 can generate a 3D model (e.g., a predicted 3D model) of the waste area, e.g., landfill, with different layers, and can continue to evolve (e.g., based on prediction techniques, and/or additional and new sensor data) based on progress of waste removal. Layers (e.g., sections, areas, layers, etc.) are depicted with boundaries to designate different types of materials in the landfill. For example, waste food items 202, smell generating garbage 204, E-Waster 206, medical waste 208, and chemical waste 210.

Figure 3:
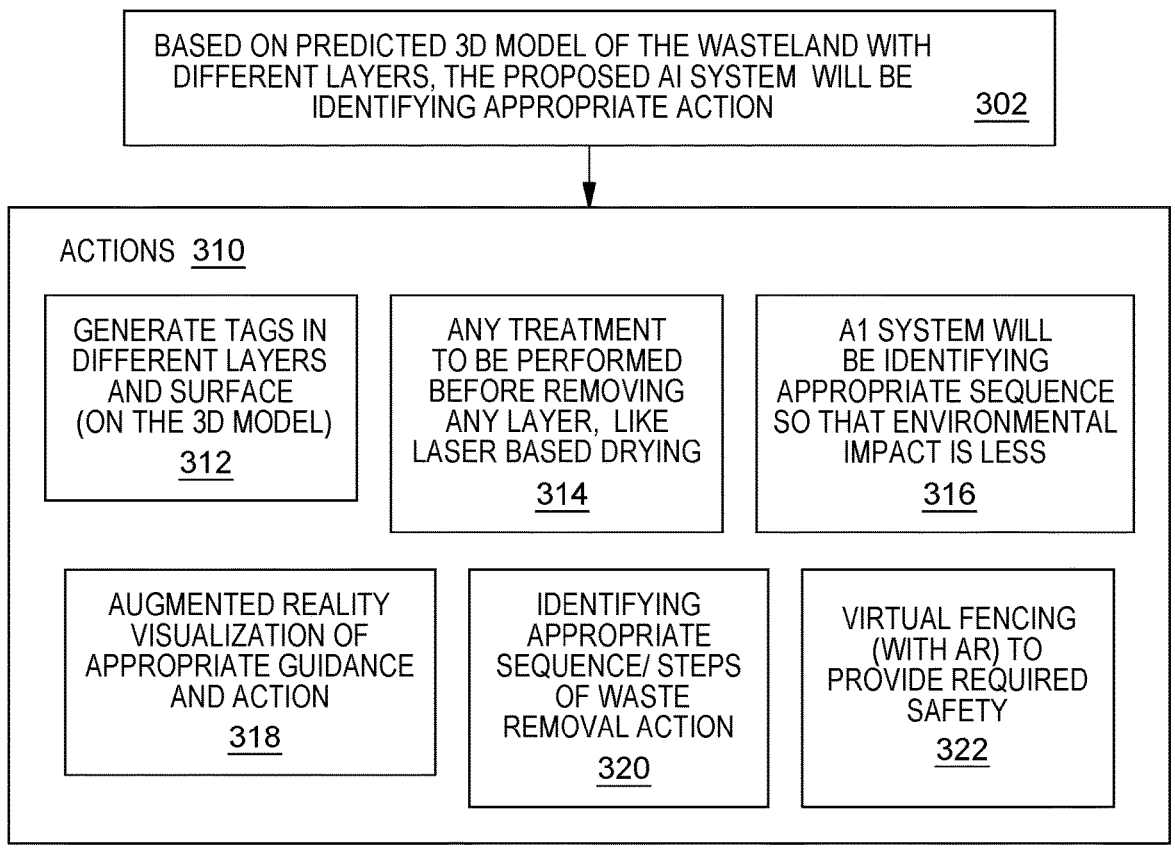
FIG. 3 is a flow chart of a method, according to an embodiment of the present disclosure, using the system depicted in FIG. 1, including the digital model shown in FIG. 2, to generate an augmented reality overlay of a digital model of a debris location to detect environmental risks for waste management.

Referring to FIG. 3, according to an embodiment of the present disclosure, the system 100 can include the following operations 300. Based on the 3D model of the waste area/landfill with different layers, the AI system 118 can identify an appropriate action(s), as in operation 302. Examples of actions 310 can include the generation of tags in different layers and surfaces on the 3D model 200, as in operation 312. In another action, a treatment can be performed before removing a layer of debris/land in the landfill, for example, a laser based drying treatment, as in operation 314. In another action, the AI system can identify an appropriate sequence so that environmental impact can be reduced, as in operation 316. In another action, an augmented reality (AR) visualization, for example using a headset, can include an appropriate guidance and action, as in operation 318. In another action, the AI system can identify an appropriate sequence/steps of waste removal action, as in operation 320. In another action, a virtual fencing (e.g., using AR) can provide safety measures or required safety measures, as in operation 322.

Additionally, implementation operations for the system 100 can include defining location, e.g., landfill, specifications which can include a landfill area being defined with requirements for size, shape, location, and depth. In one example, context for materials inclusion for a waste management facility can include a purpose of the waste management facility (e.g., landfill) which can be clearly stated. Policies on any known special types of waste may be known and clearly articulated and illustrated through waste requirements.

In one example, a setup for swarm drones for an area can be defined for the area to be serviced. The system can define when the drones will fly, both a start time and a frequency for iterative use can also be defined. Execution/deployment of the drone swarm using drones that understand the various types of sensors utilized pertaining to object recognition software onboard for live still image and video feeds. This will allow the drones to investigate various locations/mounds within the landfill. Data feeds from the drones can establish elements of 3D mapping and rendering which will be utilized for mapping the 3D layers within the landscape. Further, 3D mapping technologies can be used within drone technologies to extend the software delivery. Drones can be used for soil and field analysis, and they can be used to produce accurate 2D and 3D mapping that can be used to conduct soil analysis on soil property, moisture content, and soil erosion. In the present disclosure, drones can be used to gather soil samples and conduct soil analysis for determining materials in the soil at specific locations.

In one example in accordance with the system 100, displaying contents within a 3D model can include utilizing feeds of what is present within the landfill from various sensors. The system can assess and detect the various types of waste within various locations of the landfill. A vast array of sensors can be outfitted to a drone for a multitude of data collection. Examples of types of drone sensors can include: optical cameras; thermal sensors; lidar (Light Detection and Ranging) sensor; ground penetrating radar (GPR) sensor; antenna configuration; lightweight portable radiometer (LPR); and a multispectral camera.

The system 100 can include prediction of layers with 3D AR overlays based on the predicted 3D model of the wasteland with various types of layers identified. The AI based system can identify which appropriate actions to take, such as the following. One action can include generating tagging with various layers within an AR overlay by generating the visual overlay to empower an operator of the waste facility to make intelligent decisions pertaining to the facility using the acquisition of new data. In one example of an AR overlay, special treatment of materials can include certain types of materials needing to be treated with care when handling. Further care should be taken when dealing with flammable materials or gas producing waste. Processing for Air Exposure & Layer Requirements can include certain materials needing a drying period or layering between waste dumping. Other layers might actually require special handling if permeability becomes an issue. One example of an action may include using landfill imperviable membrane layering. In another example, environment impact may be considered within sequencing based on an AI referenced knowledge corpus which is managed for the proper elimination of waste materials. In another example, an augmented reality (visualization) of the appropriate action to be taken can include identifying the appropriate sequencing and next actions for proper waste removal management. Virtual fencing may be used for certain materials not to come into contact, which would drive proper safety protocols.

ADDITIONAL EXAMPLES AND EMBODIMENTS

Figure 5:
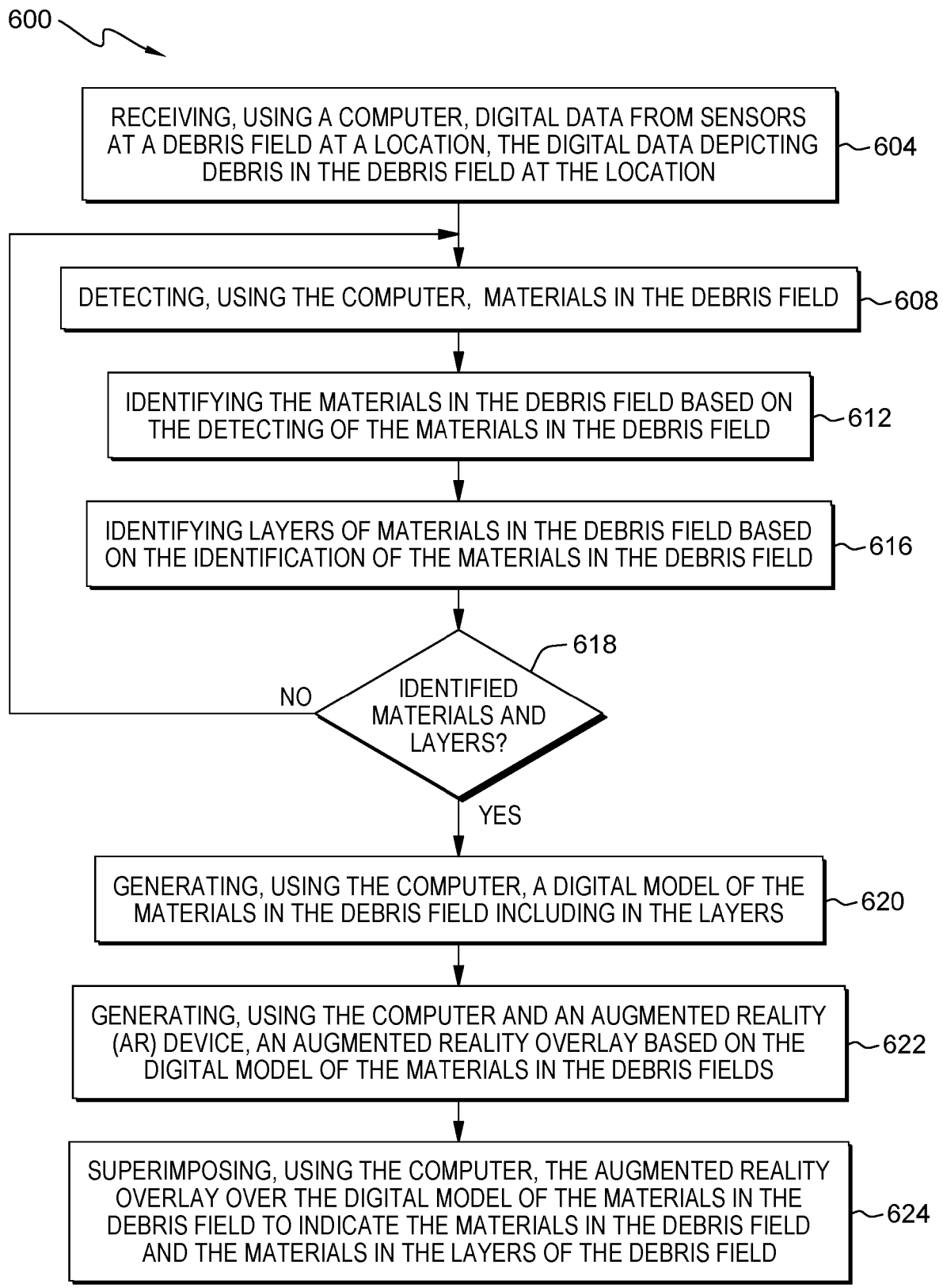
FIG. 5 is a flow chart illustrating a method according to an embodiment of the present invention which can use the system depicted in FIG. 4, for generating an augmented reality overlay of a digital model of a debris location to detect environmental risks for waste management.
Figure 6:
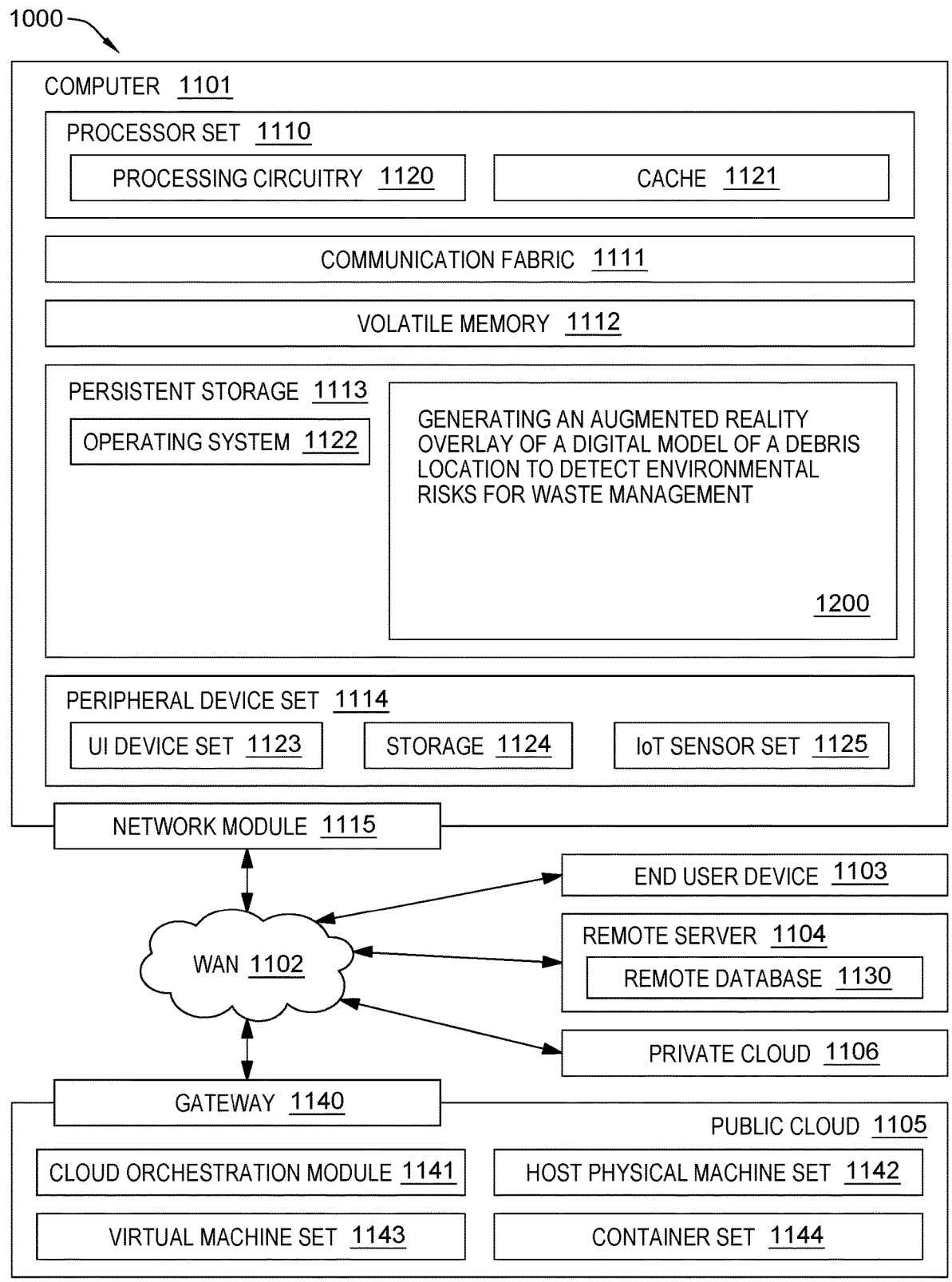
FIG. 6 is a schematic block diagram depicting a computer system according to an embodiment of the disclosure, which includes cloud computing components and functions, and which can cooperate with the systems and methods shown in the figures and described herein.

Referring to FIGS. 5 and 6, in one embodiment according to the present disclosure, a computer implemented method 600 (shown in FIG. 6), uses a system 500 (shown in FIG. 5), to generate a digital model 593 of a debris site 504 (or debris location/debris field) at a location 502, where the digital model includes an augmented reality overlay 535 of the debris location (e.g., waste management environment, or landfill) to detect environmental risks. The method includes receiving, using a computer 524 of a device 522, digital data 516 from sensors (Internet of Things (IoT) connected devices), which can include video data, video feed, digital sensor data, at a debris field at a location, as in operation 604. The sensors can include location sensors 506 and drone sensors 512 mounted or attached to drones 510. The digital data can depict debris (see FIG. 2) in the debris field at the location. The debris can be an environmentally sensitive location having hazardous materials for waste management (e.g., a landfill).

The method 600 includes detecting, using the computer, materials 514, and/or types of materials, in the debris field, and identifying the materials 514 in the debris field 504 based on the detecting of the materials 514 in the debris field 504, as in operation 608. The method 600 includes identifying the materials in the debris field based on the detecting of the materials in the debris field, as in operation 612.

The method 600 includes identifying layers of materials 515 in the debris field 504, as in operation 616, based on the identification of the materials in the debris field.

When the materials and layers are not identified in operation 618, the method returns to operation 608. When the materials and layers are identified in operation 618, the method proceeds to operation 620.

The method includes generating, using the computer, a digital model 593 of the materials 514 in the debris field 504 including in the layers 515, as in operation 620.

The method includes generating, using the computer and an augmented reality (AR) device 530, such as a headset, an augmented reality overlay 535 based on the digital model 593 of the materials in the debris fields, as in operation 622.

The method includes superimposing, using the computer, the augmented reality overlay 535 over the digital model of the materials in the debris field to indicate the materials in the debris field and the materials in the layers of the debris field, as in operation 624. Additionally, the device or headset 530 is connected to an AR system 534 having a computer 536.

In one example, the method can further include classifying the materials into types to identify the types of materials in the layers in the digital model.

In another example, the method can further include generating virtual fencing on the digital model to indicate areas of sensitive materials. For example, the areas can be contaminated or have a likelihood for contamination when mixed with other materials.

In another example, the method further includes assessing the areas of sensitive materials; and determining materials which cannot be deposited in an area of the areas of sensitive materials to minimize (or prevent) contamination (that is, an environmental hazard).

In another example, the received digital data includes video or video data. In another example, the received digital data is received from Internet of Things (IoT connected devices. In another example, the location is an environmentally sensitive location including hazardous materials for waste management. In another example, the location can be an environmentally sensitive location designated as a landfill having hazardous materials for waste management.

In another example, the method can include updating the receiving, using the computer, of the digital data from the sensors at the debris field by receiving updated digital data from the sensors, and can include updating the detecting, using the computer, the materials in the debris field. The method further includes updating the identifying of the materials in the debris field based on the updating of the detecting of the materials in the debris field and updating the identifying of the layers of materials in the debris field based on the updating of the identification of the materials in the debris field. The method can further include updating the generating, using the computer, of the digital model of the materials in the debris field including in the layers, and updating the generating, using the computer and the augmented reality (AR) device, of the augmented reality overlay based on the updated digital model of the materials in the debris fields. The method can include superimposing, using the computer, the updated augmented reality overlay over the updated digital model of the materials in the debris field to indicate the materials in the debris field and the materials in the layers of the debris field.

The method can include iteratively generating the digital model to produce updated models; and iteratively generating the augmented reality overlay to produce updated augmented reality overlays.

In another embodiment, a system for generating a digital model of a debris location where the digital model includes an augmented reality overlay of the debris location (e.g., waste management environment) to detect environmental risks. The system includes a computer system comprising; a computer processor, a computer-readable storage medium, and program instructions stored on the computer-readable storage medium being executable by the processor, to cause the computer system to perform the following functions to: receive, using a computer, digital data from sensors at a debris field at a location, the video and the digital data depicting debris in the debris field at the location; detect, using the computer, materials in the debris field. And the functions to: identify the materials in the debris field based on the detecting of the materials in the debris field; the detecting including identifying layers of materials in the debris field; and identify layers of materials in the debris field based on the identification of the materials in the debris field. And the functions to: generate, using the computer, a digital model of the materials in the debris field including in the layers; and generate, using the computer and an augmented reality (AR) device, an augmented reality overlay based on the digital model of the materials in the debris fields; and superimpose, using the computer, the augmented reality overlay over the digital model of the materials in the debris field to indicate the materials in the debris field and the materials in the layers of the debris field.

ADDITIONAL EMBODIMENTS AND EXAMPLES

A computer implemented method as disclosed herein can include modeling, for example, digital modeling and/or computational modeling, using the computer. The model can be generated using a learning engine or modeling module of a computer system which can be all or in part of an Artificial Intelligence (AI) system which communicates with the computer and/or a control system. Such a computer system can include or communicate with a knowledge corpus or historical database. In one example, an acceptable model can include a model meeting specified parameters. In another example, an acceptable model can be a model which has undergone several iterations of modeling. When the model is not acceptable, the method can return to a previous operation or proceed as directed, for example as represented by a operational block in a flowchart.

In one example according to the present disclosure, a method can generate a model, using a computer, which can include a series of operations. The model can be generated using a learning engine or modeling module of a computer system which can be all or in part of an Artificial Intelligence (AI) system which communicates with a computer and/or a control system. Such a computer system can include or communicate with a knowledge corpus or historical database.

The model can be generated using a learning engine or modeling module of a computer system which can be all or in part of an Artificial Intelligence (AI) system which communicates with a computer and/or a control system. Such a computer system can include or communicate with a knowledge corpus or historical database. A model can also be generated by an AI system such as an output at least in part of an AI system analysis using machine learning.

OTHER EXAMPLES AND EMBODIMENTS

In another example, the computer 524 can be part of a device. The computer can include a processor and a computer readable storage medium where an application can be stored which can in one example, embody all or part of the method of the present disclosure. The application can include all or part of instructions to implement the method of the present disclosure, embodied in code and stored on a computer readable storage medium. The device can include a display. The device can operate, in all or in part, in conjunction with a remote server by way of a communications network, for example, the Internet.

In other embodiments and examples, in the present disclosure shown in the figures, a computer can be part of a remote computer or a remote server, for example, a remote server. In another example, the computer can be part of a control system and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs. A device(s), for example a mobile device or mobile phone, can belong to one or more users, and can be in communication with the control system via the communications network.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device can include a computer having a processor and a storage medium which stores an application, and the computer includes a display. The application can incorporate program instructions for executing the features of the present disclosure using the processor. In another example, the mobile device application or computer software can have program instructions executable for a front end of a software application incorporating the features of the method of the present disclosure in program instructions, while a back end program or programs, of the software application, stored on the computer of the control system communicates with the mobile device computer and executes other features of the method. The control system and the device (e.g., mobile device or computer) can communicate using a communications network, for example, the Internet.

Methods and systems according to embodiments of the present disclosure, can be incorporated in one or more computer programs or an application stored on an electronic storage medium, and executable by the processor, as part of the computer on mobile device. For example, a mobile device can communicate with the control system, and in another example, a device such as a video feed device can communicate directly with the control system. Other users (not shown) may have similar mobile devices which communicate with the control system similarly. The application can be stored, all or in part, on a computer or a computer in a mobile device and at a control system communicating with the mobile device, for example, using the communications network, such as the Internet. It is envisioned that the application can access all or part of program instructions to implement the method of the present disclosure. The program or application can communicate with a remote computer system via a communications network (e.g., the Internet) and access data, and cooperate with program(s) stored on the remote computer system. Such interactions and mechanisms are described in further detail herein and referred to regarding components of a computer system, such as computer readable storage media, which are shown in one or more embodiments herein and described in more detail in regards thereto referring to one or more computers and systems described herein.

Also, referring to the figures, a device can include a computer, computer readable storage medium, and operating systems, and/or programs, and/or a software application, which can include program instructions executable using a processor. Embodiments of these features are shown herein in the figures. The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Referring to one or more embodiments in the figures, a computer or a device, also can be referred to as a user device or an administrator's device, includes a computer having a processor and a storage medium where an application can be stored. The application can embody the features of the method of the present disclosure as instructions. The user can connect to a learning engine using the device. The device which includes the computer and a display or monitor. The application can embody the method of the present disclosure and can be stored on the computer readable storage medium. The device can further include the processor for executing the application/software. The device can communicate with a communications network, e.g., the Internet.

It is understood that the user device is representative of similar devices which can be for other users, as representative of such devices, which can include, mobile devices, smart devices, laptop computers etc.

ADDITIONAL EXAMPLES AND EMBODIMENTS

In one example, a system according to the present disclosure can include a control system communicating with a user device via a communications network. The control system can incorporate all or part of an application or software for implementing the method of the present disclosure. The control system can include a computer readable storage medium where account data and/or registration data can be stored. User profiles can be part of the account data and stored on the storage medium. The control system can include a computer having computer readable storage medium and software programs stored therein. A processor can be used to execute or implement the instructions of the software program. The control system can also include a database.

A control system can include a storage medium for maintaining a registration of users and their devices for analysis of the audio input. Such registration can include user profiles, which can include user data supplied by the users in reference to registering and setting-up an account. In an embodiment, the method and system which incorporates the present disclosure includes the control system (generally referred to as the back-end) in combination and cooperation with a front end of the method and system, which can be the application. In one example, the application is stored on a device, for example, a computer or device on location, and can access data and additional programs at a back end of the application, e.g., control system.

Figure 4:
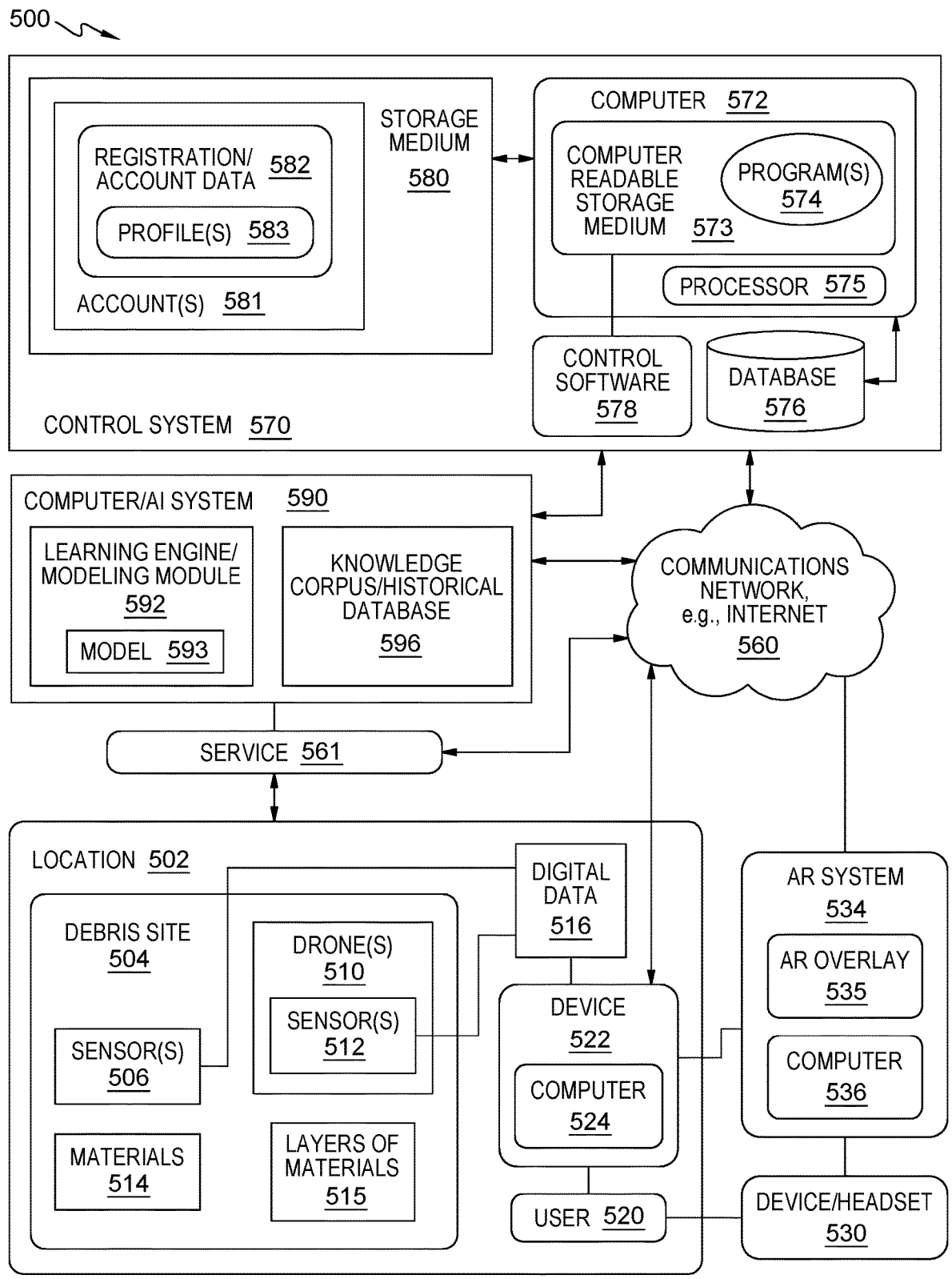
FIG. 4 is a schematic block diagram of a system, according to another embodiment of the present disclosure, for generating an augmented reality overlay of a digital model of a debris location to detect environmental risks for waste management.

Referring to the figures, and for example, FIG. 4, a system 500 includes a computer which can be integral to or communicating with a device, and communicate with other computers such as computer of the delivery system. A computer 590 remote from a user computer and can electronically communicate, in all or in part, with a control system computer 572 as part of a control system 570. The control system 570 can include the computer 572 having a computer readable storage medium 573 which can store one or more programs 574, and a processor 575 for executing program instructions. The control system 570 can include control software 578 for managing the one or more programs. The control system can also include a storage medium which can include registration and/or account data 582 and user profiles 583 of users or entities (such entities can include robotic entities) as part of user accounts 581. User accounts 581 can be stored on a storage medium 580 which is part of the control system 570. The user accounts 581 can include registrations and account data 582 and user profiles 583. The control system can also include the computer 572 having a computer readable storage medium 573 which can store programs or code embedded on the storage medium. The program code can be executed by a processor 575. The computer 572 can communicate with a database 576. The control system 570 can also include a database 576 for storing all or part of such data as described above, and other data.

The control system can also communicate with a computer system 590 which can include a learning engine/module 592 and a knowledge corpus or database 596. The computer system 590 can also communicate with a computer of a device and can be remote from the user device. In another example, the computer system 590 can be all or part of the control system, or all or part of the device. The control system 570 and system 590 can also work, all or in part, as a service 561. The depiction of the computer system 590 as well as the other components of the system 500 are shown as one example according to the present disclosure. One or more computer systems can communicate with a communications network 560, e.g., the Internet. For example, the computer 590, and the control system 570 can communicate with the communications network 560, and the device/computer can communicate with a local communications network which can communicate with the communications network 560.

Thus, in one example, a control system can be in communication with a computer or device, and the computer can include an application or software. The computer, or a computer in a mobile device can communicate with the control system using the communications network. In another example, the control system can have a front-end computer belonging to one or more users, and a back-end computer embodied as the control system.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, which may be shown, for example, in the example figures, for instance an application stored on a computer readable storage medium of a computer or device. The application is stored on the device or computer and can access data and additional programs at the back end of the application, for example, in the program(s) stored in the control system.

The program(s) can include all or in part, a series of executable steps for implementing the method of the present disclosure. A program, incorporating the present method, can be all or in part stored in the computer readable storage medium on the control system or, in all or in part, on a computer or device. It is envisioned that the control system can not only store the profile of users, but in one embodiment, can interact with a website for viewing on a display of a device such as a mobile device, or in another example the Internet, and receive user input related to the method and system of the present disclosure. It is understood that embodiments shown in the figures depicts one or more profiles, however, the method can include multiple profiles, users, registrations, etc. It is envisioned that a plurality of users or a group of users can register and provide profiles using the control system for use according to the method and system of the present disclosure.

In one example, received data can include data in a knowledge corpus and historical database, which can be populated by historical data gathered, for example, from sensors, robotic device, or other machines or devices.

In another example and embodiment, profiles can be saved for entities such as users, participants, operators, human operators, or robotic devices. Such profiles can supply data regarding the user and history of deliveries for analysis. In one example, a user can register or create an account using the control system which can include one or more profiles as part of registration and/or account data. The registration can include profiles for each user having personalized data. For example, users can register using a website via their computer and GUI (Graphical User Interface) interface. The registration or account data can include profiles for an account for each user. Such accounts can be stored on the control system, which can also use the database for data storage. A user and a related account can refer to, for example, a person, an administrator, or an operator, or an entity, or a corporate entity, or a corporate department, or another machine such as an entity for automation such as a system using, in all or in part, artificial intelligence.

FURTHER EMBODIMENTS AND EXAMPLES

Account data, for instance, including profile data related to a user, and any data, personal or otherwise, can be collected and stored, for example, in a control system. It is understood that such data collection is done with the knowledge and consent of a user, and stored to preserve privacy, which is discussed in more detail below. Such data can include personal data, and data regarding personal items.

In one example a user can register and have an account with a user profile on a control system. For example, data can be collected using techniques as discussed above, for example, using cameras, and data can be uploaded to a user profile by the user. A user can include, for example, a corporate entity, or department of a business, or a homeowner, or any end user, a human operator, or a robotic device, or other personnel of a business.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

OTHER ADDITIONAL EMBODIMENTS AND EXAMPLES

In one example, Artificial Intelligence (AI) can be used, all or in part, for generating a model or a learning model as discussed herein in embodiments of the present disclosure. An Artificial Intelligence (AI) System can include machines, computer, and computer programs which are designed to be intelligent or mirror intelligence. Such systems can include computers executing algorithms. AI can include machine learning and deep learning. For example, deep learning can include neural networks. An AI system can be cloud based, that is, using a cloud-based computing environment having computing resources. In another example, a control system can be all or part of an Artificial Intelligence (AI) system. For example, the control system can be one or more components of an AI system.

It is also understood that methods and systems according to embodiments of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

MORE EXAMPLES AND EMBODIMENTS

Additionally, methods and systems according to embodiments of the present disclosure can be discussed in relation to a functional system(s) depicted by functional block diagrams. The methods and systems can include components and operations for embodiments according to the present disclosure and is used herein for reference when describing the operational steps of the methods and systems of the present disclosure. Additionally, the functional system, according to an embodiment of the present disclosure, depicts functional operations indicative of the embodiments discussed herein.

The methods and systems of the present disclosure can include a series of operational blocks for implementing one or more embodiments according to the present disclosure. A method shown in the figures may be another example embodiment, which can include aspects/operations shown in another figure and discussed previously, but can be reintroduced in another example. Thus, operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

It is understood that the features shown in some of the figures, for example block diagrams, are functional representations of features of the present disclosure. Such features are shown in embodiments of the systems and methods of the present disclosure for illustrative purposes to clarify the functionality of features of the present disclosure.

FURTHER DISCUSSION REGARDING EXAMPLES AND EMBODIMENTS

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machine or devices in one or ecosystems or environments, which can include, for example and artificial intelligence (AI) environment.

The descriptions of the various embodiments of the present invention have been presented for purposes of illustration but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is also understood that the one or more computers or computer systems shown in the figures can include all or part of a computing environment and its components shown in another figure, for example, the computing environment 1000 can be incorporated, in all or in part, in one or more computers or devices shown in other figures and described herein. In one example, the one or more computers can communicate with all or part of a computing environment and its components as a remote computer system to achieve computer functions described in the present disclosure.

MORE ADDITIONAL EXAMPLES AND EMBODIMENTS

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 6, a computing environment 1000 contains an example of an environment for the execution of at least some of the computer code involved in performing the inventive methods, such as detection of an event, such as a breach of the pressurized housing, and actuation of a device or mechanism for rendering modules inoperable, such as damaging memory modules to render them inoperable 1200. In addition to block 1200, computing environment 1000 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 7. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101) and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105.

The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

What is claimed is:

1. A computer implemented method for generating an augmented reality overlay of a digital model of a debris location to detect environmental risks for waste management, comprising:
   receiving, using a computer, digital data from sensors at a debris field at a location, the digital data depicting debris in the debris field at the location;
   detecting, using the computer, materials in the debris field;
   identifying the materials in the debris field based on the detecting of the materials in the debris field;
   identifying layers of materials in the debris field based on the identification of the materials in the debris field;
   generating, using the computer, a digital model of the materials in the debris field including in the layers;
   generating, using the computer and an augmented reality (AR) device, an augmented reality overlay based on the digital model of the materials in the debris fields; and
   superimposing, using the computer, the augmented reality overlay over the digital model of the materials in the debris field to indicate the materials in the debris field and the materials in the layers of the debris field.

2. The method of claim 1, further comprising:
   classifying the materials into types to identify the types of materials in the layers in the digital model.

3. The method of claim 2, further comprising:
   generating virtual fencing on the digital model to indicate areas of sensitive materials.

4. The method of claim 3, further comprising:
   assessing the areas of sensitive materials; and
   determining materials which cannot be deposited in an area of the areas of sensitive materials to minimize contamination.

5. The method of claim 1, wherein the received digital data includes video.

6. The method of claim 1, wherein the received digital data is received from Internet of Things (IoT) connected devices.

7. The method of claim 1, wherein the location is an environmentally sensitive location including hazardous materials for waste management.

8. The method of claim 7, wherein the location is an environmentally sensitive location designated as a landfill having hazardous materials for waste management.

9. The method of claim 1, further comprising:
   updating the receiving, using the computer, of the digital data from the sensors at the debris field by receiving updated digital data from the sensors;
   updating the detecting, using the computer, the materials in the debris field;
   updating the identifying of the materials in the debris field based on the updating of the detecting of the materials in the debris field;
   updating the identifying of the layers of materials in the debris field based on the updating of the identification of the materials in the debris field;
   updating the generating, using the computer, of the digital model of the materials in the debris field including in the layers;
   updating the generating, using the computer and the augmented reality (AR) device, of the augmented reality overlay based on the updated digital model of the materials in the debris fields; and
   superimposing, using the computer, the updated augmented reality overlay over the updated digital model of the materials in the debris field to indicate the materials in the debris field and the materials in the layers of the debris field.

10. The method of claim 9, further comprising:
    iteratively generating the digital model to produce updated models; and
    iteratively generating the augmented reality overlay to produce updated augmented reality overlays.

11. A system for generating an augmented reality overlay of a digital model of a debris location to detect environmental risks for waste management, which comprises:
    a computer system comprising; a computer processor, a computer-readable storage medium, and program instructions stored on the computer-readable storage medium being executable by the processor, to cause the computer system to perform the following functions to;
    receive, using a computer, digital data from sensors at a debris field at a location, the video and the digital data depicting debris in the debris field at the location;
    detect, using the computer, materials in the debris field;

identify the materials in the debris field based on the detecting of the materials in the debris field;

identify layers of materials in the debris field based on the identification of the materials in the debris field;

generate, using the computer, a digital model of the materials in the debris field including in the layers;

generate, using the computer and an augmented reality (AR) device, an augmented reality overlay based on the digital model of the materials in the debris fields; and superimpose, using the computer, the augmented reality overlay over the digital model of the materials in the debris field to indicate the materials in the debris field and the materials in the layers of the debris field.

12. The system of claim 11, further comprising:
classifying the materials into types to identify the types of materials in the layers in the digital model.

13. The system of claim 12, further comprising:
generating virtual fencing on the digital model to indicate areas of sensitive materials.

14. The system of claim 13, further comprising:
assessing the areas of sensitive materials; and
determining materials which cannot be deposited in an area of the areas of sensitive materials to minimize contamination.

15. The system of claim 11, wherein the received digital data includes video.

16. The system of claim 11, wherein the received digital data is received from Internet of Things (IoT) connected devices.

17. The system of claim 11, wherein the location is an environmentally sensitive location including hazardous materials for waste management.

18. The system of claim 17, wherein the location is an environmentally sensitive location designated as a landfill having hazardous materials for waste management.

19. The system of claim 11, further comprising:
updating the receiving, using the computer, of the digital data from the sensors at the debris field by receiving updated digital data from the sensors;

updating the detecting, using the computer, the materials in the debris field;

updating the identifying of the materials in the debris field based on the updating of the detecting of the materials in the debris field;

updating the identifying of the layers of materials in the debris field based on the updating of the identification of the materials in the debris field;

updating the generating, using the computer, of the digital model of the materials in the debris field including in the layers;

updating the generating, using the computer and the augmented reality (AR) device, of the augmented reality overlay based on the updated digital model of the materials in the debris fields; and superimposing, using the computer, the updated augmented reality overlay over the updated digital model of the materials in the debris field to indicate the materials in the debris field and the materials in the layers of the debris field.

20. A computer program product for generating an augmented reality overlay of a digital model of a debris location to detect environmental risks for waste management, the computer program product comprising a computer readable storage medium having program instructions embodied therewith, the program instructions executable by a computer to cause the computer to perform functions, by the computer, comprising the functions to;

receive, using a computer, digital data from sensors at a debris field at a location, the video and the digital data depicting debris in the debris field at the location;

detect, using the computer, materials in the debris field;

identify the materials in the debris field based on the detecting of the materials in the debris field;

identify layers of materials in the debris field based on the identification of the materials in the debris field;

generate, using the computer, a digital model of the materials in the debris field including in the layers;

generate, using the computer and an augmented reality (AR) device, an augmented reality overlay based on the digital model of the materials in the debris fields; and superimpose, using the computer, the augmented reality overlay over the digital model of the materials in the debris field to indicate the materials in the debris field and the materials in the layers of the debris field.

\* \* \* \* \*